United States Patent
King

(10) Patent No.: US 7,023,106 B2
(45) Date of Patent: Apr. 4, 2006

(54) STEERING COLUMN ASSEMBLY HAVING INTEGRATED ELECTRICAL CONNECTION

(75) Inventor: Todd M. King, Saginaw, MI (US)

(73) Assignee: Delphi Technologies, Inc., Troy, MI (US)

( * ) Notice: Subject to any disclaimer, the term of this patent is extended or adjusted under 35 U.S.C. 154(b) by 504 days.

(21) Appl. No.: 10/266,883

(22) Filed: Oct. 7, 2002

(65) Prior Publication Data

US 2004/0066091 A1    Apr. 8, 2004

(51) Int. Cl.
*H02L 1/00*    (2006.01)
(52) U.S. Cl. .................. 307/10.1; 307/9.1; 180/78
(58) Field of Classification Search .............. 307/9.1, 307/10.1; 180/78; 701/41
See application file for complete search history.

(56) References Cited

U.S. PATENT DOCUMENTS

| 4,345,806 A | * | 8/1982 | McHenney ............ 439/510 |
| 5,148,717 A | * | 9/1992 | Yamaguchi ............ 74/493 |
| 5,606,892 A | * | 3/1997 | Hedderly ............ 74/493 |
| 6,501,023 B1 | * | 12/2002 | Tsunoda et al. ........ 174/72 A |
| 2001/0028196 A1 | | 10/2001 | Burr et al. |

OTHER PUBLICATIONS

IEEE 488.1-1981 Standard digital interface for programmable instrumentation Chapter 5 Electrical Specifications Sections 2-3.*

* cited by examiner

*Primary Examiner*—Lynn Feild
*Assistant Examiner*—Michael Rutland-Wallis
(74) *Attorney, Agent, or Firm*—Michael D. Smith

(57) ABSTRACT

A steering column assembly having a support structure, a tilt portion, and a switch module is provided. The support structure is securable to a vehicle. The tilt portion is pivotally secured to the support structure such that the tilt portion can pivot about a pivot axis through a selected range of motion with respect to the support structure. A first electrical connecting member is disposed on the tilt portion proximate the pivot axis. The switch module has a second electrical connecting member connected to the first electrical connecting member such that the switch module in electrical communication with a wiring harness.

15 Claims, 3 Drawing Sheets

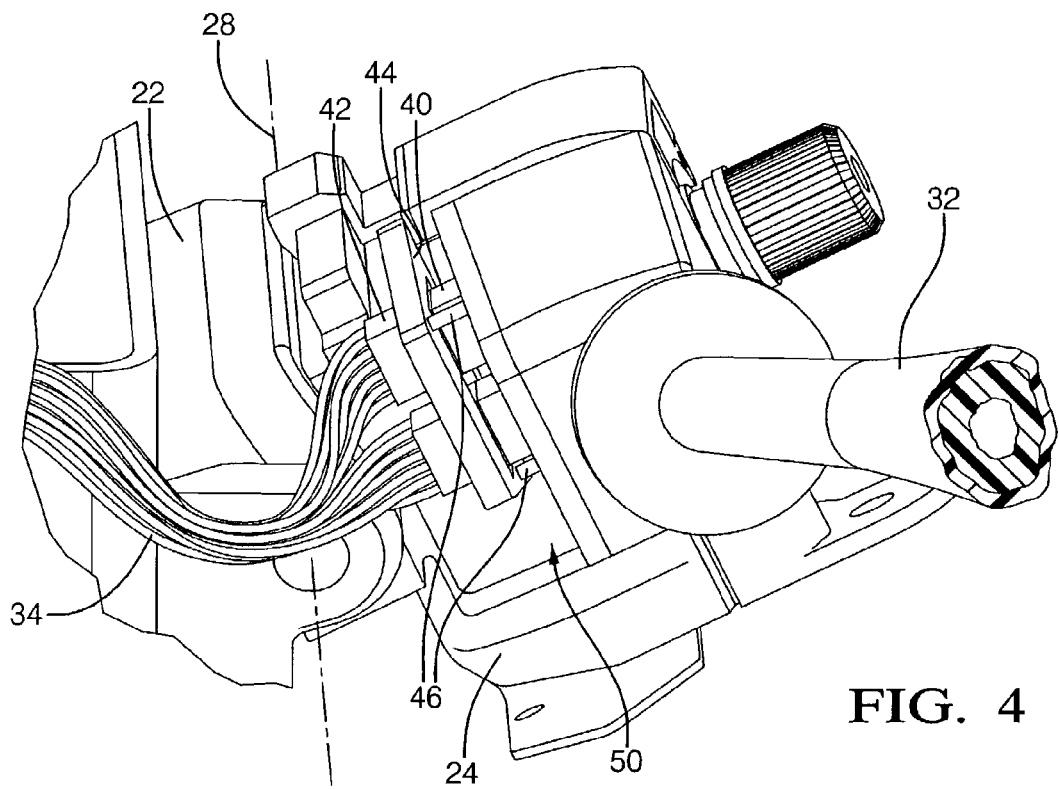
FIG. 4
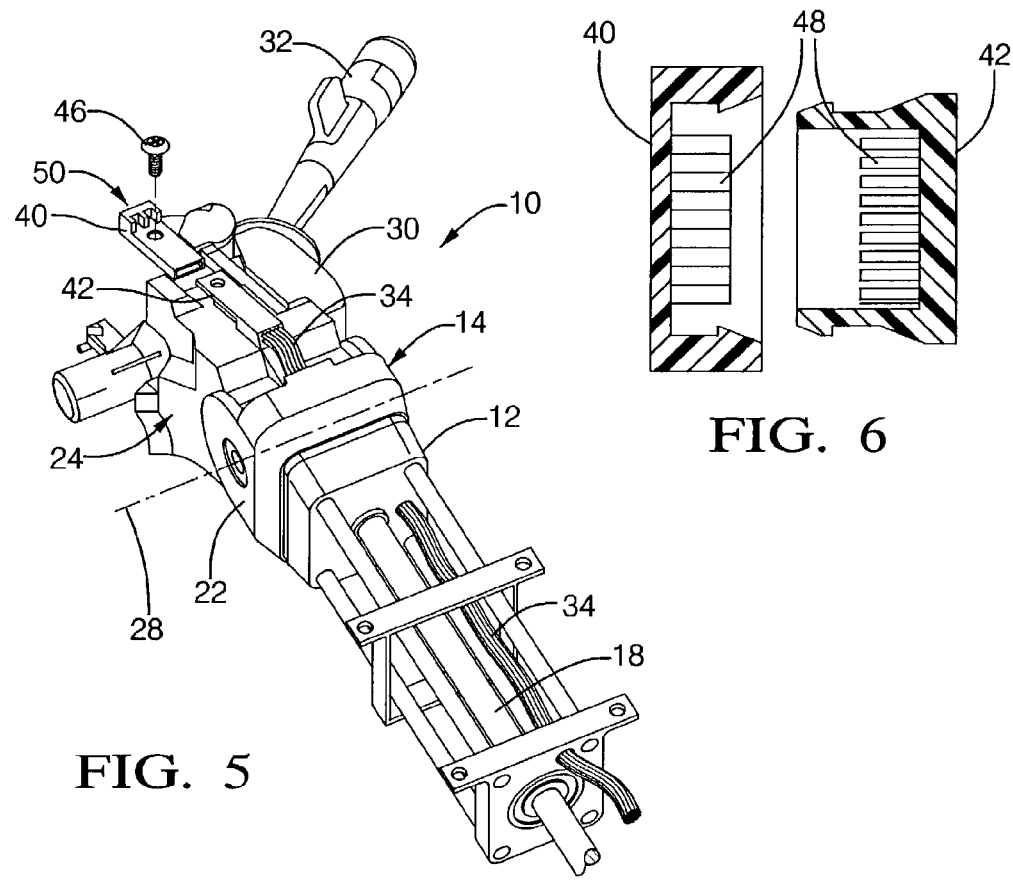
FIG. 5
FIG. 6

STEERING COLUMN ASSEMBLY HAVING INTEGRATED ELECTRICAL CONNECTION

TECHNICAL FIELD

This disclosure relates generally to a steering column assembly. More specifically, this disclosure relates to a steering column assembly having an integrated electrical connection.

BACKGROUND

Modern vehicles are being provided with more and more equipment to enhance ease of use and driver comfort. This equipment is being incorporated into the steering wheel and/or the steering column assembly for the convenience of the driver. Since this equipment is typically electrically activated, more and more wiring cables are required to connect this equipment to the other parts of the vehicle.

As a result, an increase in wiring cables in the steering column assembly is necessary for local and remote operation of the equipment. This increase can make it difficult to locate the wiring cables in the steering column assembly. For example, a limited amount of room can be available in the steering column assembly for the wiring cables. In addition, it is often desired to protect the wiring cables from pinch points, abrasion areas, and moving parts that can often be found in the steering column assembly.

Accordingly, there is a continuing need for steering column assemblies that can accommodate the ever increasing demands for wiring cables in the assembly.

SUMMARY

A steering column assembly comprising a support structure, a tilt portion, and a switch module is provided. The support structure is securable to a vehicle. The tilt portion is pivotally secured to the support structure such that the tilt portion can pivot about a pivot axis through a selected range of motion with respect to the support structure. A first electrical connecting member is disposed on the tilt portion proximate the pivot axis. The switch module has a second electrical connecting member connected to the first electrical connecting member such that the switch module in electrical communication with a wiring harness.

A steering column assembly having a support structure, a tilt portion, a first electrical connecting member, a wiring harness, and a switch module is provided. The support structure is securable to a portion of a vehicle. The tilt portion is pivotally secured to the support structure such that the tilt portion is pivotable with respect to the support structure about a pivot axis. The first electrical connecting member is integral with the tilt portion proximate the pivot axis. The wiring harness is in electrical communication with the first electrical connecting member. The switch module has a second electrical connecting member removably connected to the first electrical connecting member such that the switch module and the wiring harness are in electrical communication with one another.

A method of assembling a steering column assembly is also provided. The method comprises connecting a wiring harness to a first electrical connecting member, the first electrical connecting member being proximate a pivot axis defined between two portions of the steering column assembly; connecting a second electrical connecting member of a switch module to the first electrical connecting member; and securing the switch module to one of the two portions of the steering column assembly. The first and second electrical connecting members place the switch module in electrical communication with a wiring harness.

An integrated electrical connection for a steering column assembly is also provided. The integrated electrical connection comprises a wiring harness having a bulkhead connection and a first electrical connecting member, and a second electrical connecting member disposed on a switch module. The first and second electrical connecting members slideably mate to electrically connect the switch module and the bulkhead connection. The bulkhead connection is connectable to the steering column assembly at a first end of a first portion of the steering column assembly. A second end of the first portion is pivotally connected to a second portion of the steering column assembly such that the first portion can pivot about a pivot axis through a selected range of motion with respect to the second portion. The first electrical connecting member is disposed on the second portion of the steering column assembly proximate the pivot axis such that the wiring harness traverses the pivot axis and is movable through the range of motion without a separate strain relief mechanism.

The above-described and other features are appreciated and understood by those skilled in the art from the following detailed description, drawings, and appended claims.

DESCRIPTION OF THE DRAWINGS

The present invention will now be described, by way of example, with reference to the accompanying drawings, in which:

FIG. 4 is a side view of the integral electrical connection system of FIG. 1 in an assembled state;

FIG. 5 is a perspective view of a steering column assembly having an alternate exemplary embodiment of an integral electrical connection system; and FIG. 6 is a side view of the integral electrical connection system of FIG. 5.

DETAILED DESCRIPTION

Figure 1:
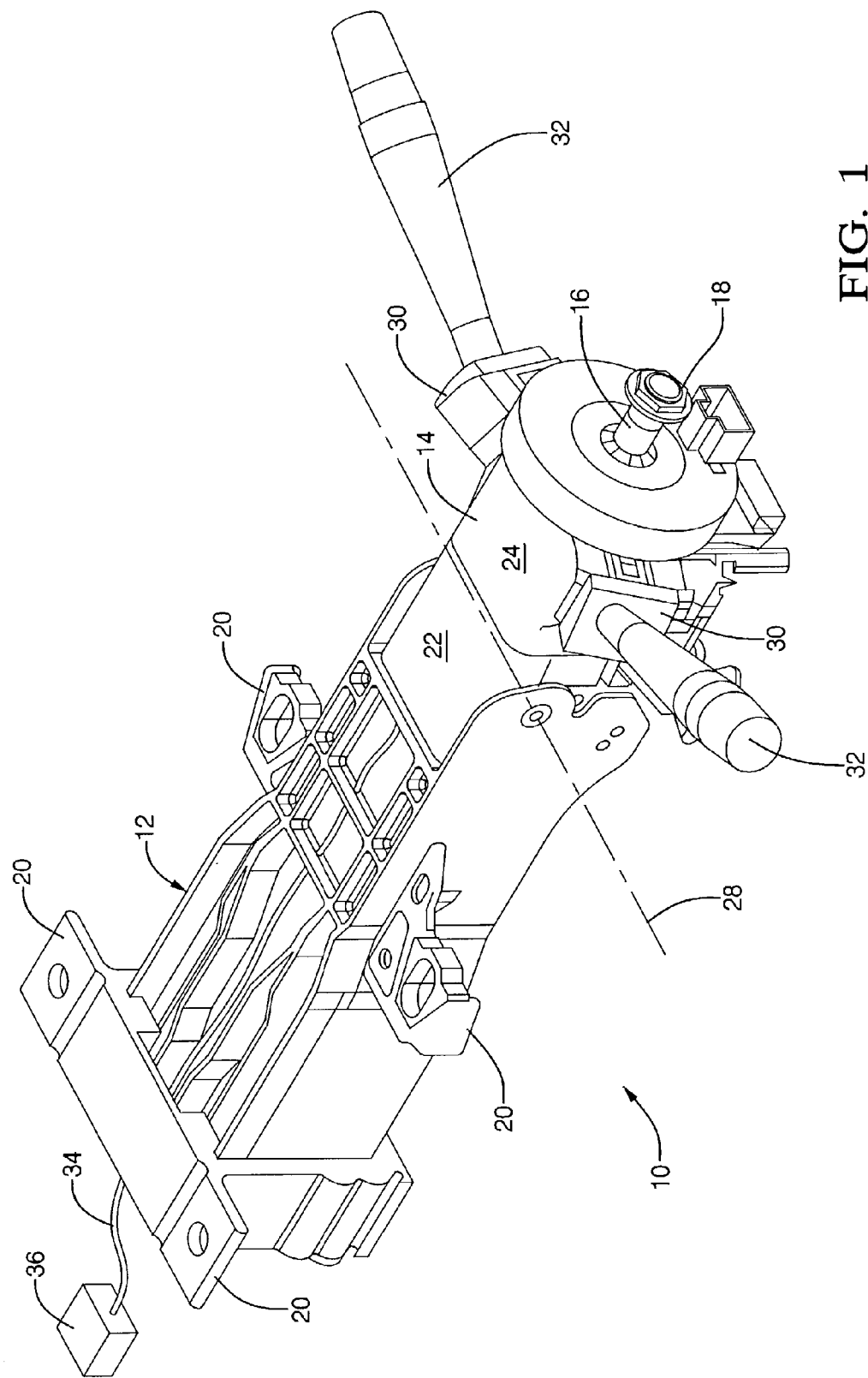
FIG. 1 is a perspective view of a steering column assembly having an exemplary embodiment of an integral electrical connection system.

Referring now to the figures and in particular to FIG. 1, an exemplary embodiment of a steering column assembly 10 is illustrated. The steering column assembly 10 comprises a support structure 12, a housing portion 14, and an upper steering shaft 16. The upper steering shaft 16 is configured to receive a steering wheel (not shown) at a first end 18.

The upper steering shaft 16 is rotatably supported within the housing 14 and the support structure 12. The upper steering shaft 16 is configured to translate rotational motion from the steering wheel to a steerable device, such as a set of road wheels (not shown). For example, a pinion gear can be operatively connected to the steering shaft 16. Thus, rotation of the steering shaft 16 causes the pinion to rotate. The pinion gear is meshingly engaged with a rack gear, which is operatively connected to the steerable road wheels by an articulated mechanical linkage. In this manner, the rotation of the steering wheel is translated into a linear movement of the rack, which causes the articulated mechanical linkage to steer the road wheels in a known manner.

Of course, it should be recognized that the steering system is described above by way of example only. Other steering systems, such as steering gear systems and drive-by-wire systems, for translating the rotational movement of the steering shaft into a linear movement of the road wheels are contemplated.

The support structure 12 is configured to secure the housing 14 to one or more portions of the vehicle. For example, the support structure 12 can be connected to one or more cross car beams (not shown) at connection points 20.

The housing portion 14 can comprise a tilt portion 24 pivotally connected to a stationary portion 22. The stationary portion 22 can be connected to the support structure 12 or can be integral with the support structure. The tilt portion 24 is configured to move or tilt about a pivot axis 28 with respect to the stationary portion 22 through a selected range of motion. This range of motion allows the position of the steering wheel to be adjusted to one or more desired positions.

The steering column assembly 10 further comprises one or more switch modules 30. In the illustrated embodiment, the switch modules 30 comprise control stalks 32 for controlling the various features of the vehicle, such as but not limited to, turn signals, windshield wipers, head lights, driving lights, windshield washer fluid pumps, intermittent wiper delays, others, and combinations of one or more of the foregoing. Of course, other switch modules are contemplated in the present disclosure. For example, the switch modules 30 can include the control of vehicle features such as, but not limited to, ignition systems, supplement restraint system components, electronic security devices, cruise control, audio system control, hands-free telephone systems, navigation systems, others, and combinations of one or more of the foregoing.

The switch modules 30 can be connected to the tilt portion 24 to ensure that the control stalks 32 are in close proximity to the steering wheel. The switch modules 30 are connected to a wiring harness 34 that runs from the switch modules to a unified vehicle interface or bulkhead connection 36. The connection 36 is configured to place the switch module 30 and the vehicle in electrical communication with one another through the harness 34. In this manner, the wiring harness 34 is configured to provide switch signals from the modules 30 to the vehicle. The switch signals can be low current signals (e.g., 4–20 milliamp signals), control voltage signals (e.g., 12–48 volt signals), and combinations of the foregoing. The low current wiring harness has a thickness of about 5 millimeters. The control voltage wiring harness has a thickness of about 10 millimeters.

The wiring harness 34 needs to allow for the full range of motion of the tilt portion 24. Moreover, the wiring harness 34 needs to allow for the full range of motion at various vehicle temperatures (e.g., from about +100 degrees Celsius to about −40 degrees Celsius). These temperatures can affect the material properties of the wiring harness's components, such that the electrical wires and insulating coatings. Prior steering assemblies have required bulky and expensive strain relief systems to accommodate for the range of motion of the tilt portion.

Figure 2:
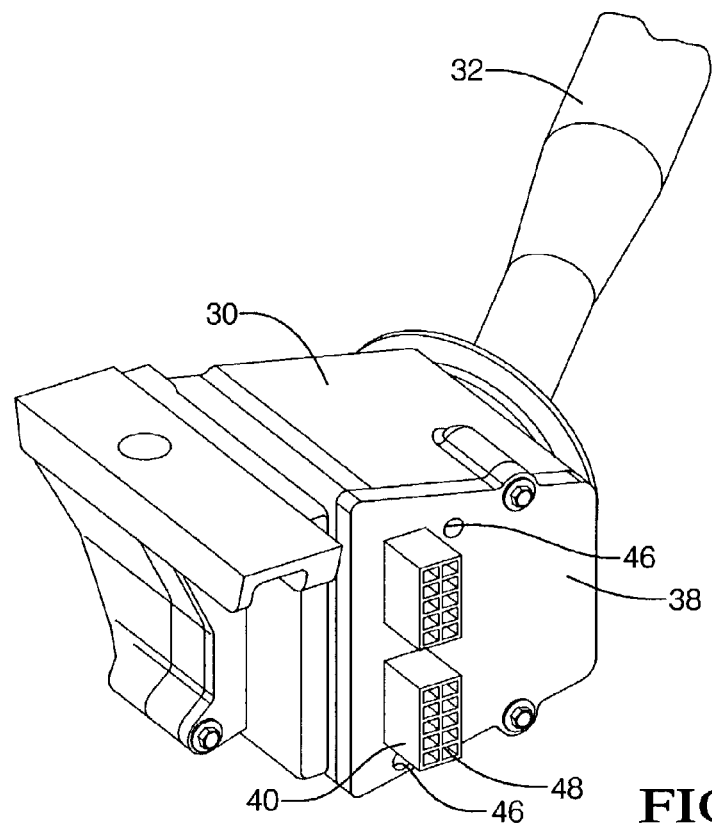
FIG. 2 is a bottom perspective view of an exemplary embodiment of a switch module.
Figure 3:
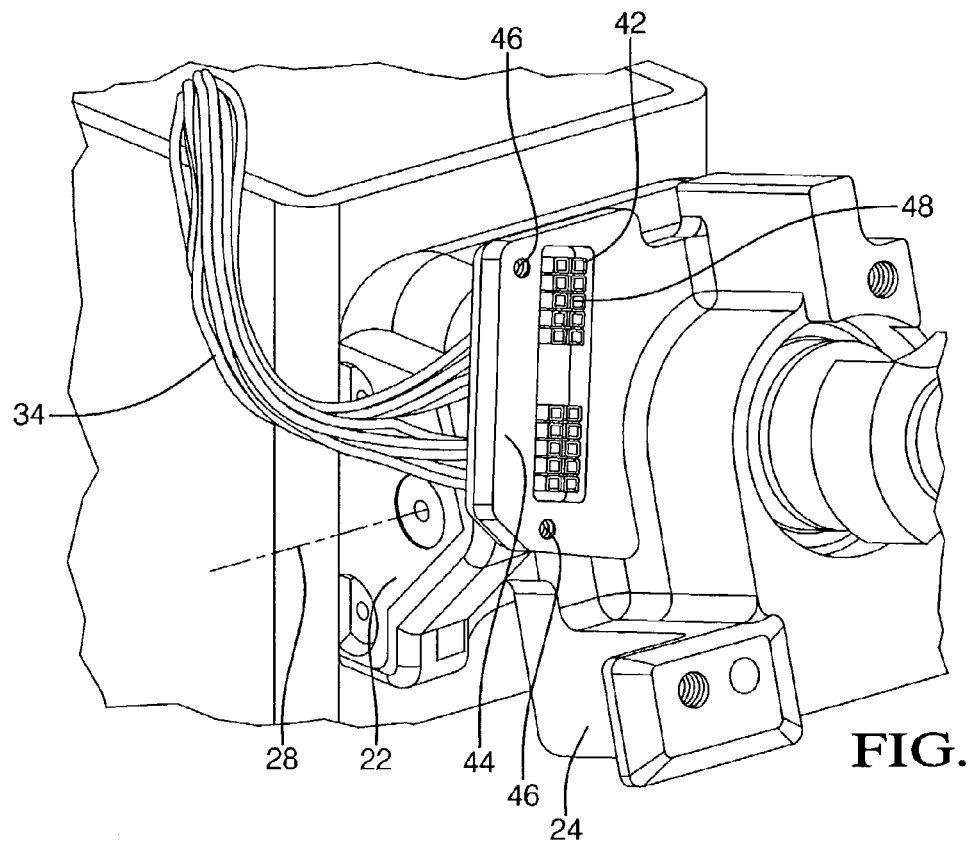
FIG. 3 is a top perspective view of the integral electrical connection system of FIG. 1 in a partially assembled state.

Referring now to FIGS. 2–4, an exemplary embodiment of an integrated connection system 50 for connecting the wiring harness 34 and the switch module 30 is illustrated. The integrated connection system 50 provides for robust strain relief in the wiring harness 34, minimizes the assembly time of the assembly 10, and reduces the overall size of the wiring harness. The connection system 50 integrates multiple and seemingly unrelated functions together to provide these and other benefits.

It has been determined that the range of motion of the wiring harness 34 is minimized when the connection between the harness and the switch modules 30 are close to the pivot axis 28. It has been determined that locating the connection system 50 proximate the pivot axis 28 eliminates the need for a separate strain relief mechanism by minimizing the flexion of the wiring harness. In addition, the connection system 50 is integrated into the tilt housing 24 to minimize the need for a separate means for connecting the switch module to the tilt housing. The integration of these components and functions into a single integrated connection system minimizes both the cost and the size of the system.

The switching module 30 comprises a bottom section 38 having an electrical connecting member 40. The tilt portion 24 comprises one or more electrical connecting members 42 (only one shown) proximate the pivot axis 28. In an exemplary embodiment, the electrical connecting members 42 can be located from the pivot axis 28 a distance from about 18 mm (millimeters) to about 33 mm.

The members 42 can be integral with the tilt portion 24 or can be received in a casting provision 44 formed on the tilt portion. The wiring harness 34 and the connecting member 40 of the switch module 30 can be mated with opposite sides of the connecting member 42.

Alternately, the member 42 can be formed as part of the wiring harness 34. During the installation of the harness 34, the member 42 can be secured in the casting provision 44. The switch module 30 can be secured to the casting provision 44 with threaded fasteners 46 such that the bottom 38 of the module 30 rests on the casting provision. When both the wiring harness 34 and the switch module 30 are secured to the casting provision 44, the connecting members 40 and 42 are in electrical communication with one another.

It should be recognized that the electrical connecting members 40 and 42 are illustrated by way of example only as a plurality of connecting pins 48. Of course, other types of electrical connecting members are contemplated.

The integrated connection 50 improves the reliability of the connection between the wiring harness and switch modules. Integrated connection 50 provides a strain relief to allow the tilt portion 24 to move freely through its range of motion with minimal impact or movement of the wiring harness. In addition, the integrated electrical connection 50 minimizes the size and cost of the wiring harness by combining and eliminating parts.

Turning now to FIGS. 5–6, an alternate exemplary embodiment of the integrated electrical connection 50 for connecting the wiring harness 34 and the switch module 30 is illustrated.

The switching module 30 comprises a portion 38 having an electrical connecting member 40. The tilt portion 24 comprises one or more electrical connecting members 42 proximate the pivot axis 28. The members 42 can be integral with the tilt portion 24. For example, the members 42 can be insert molded with the tilt portion 24.

The wiring harness 34 and the connecting member 40 of the switch module 30 can both be placed in electrical communication with the connecting member 42. Specifically, the connecting member 40 of the module 30 is configured to slideably mate with the connecting member 42 of the tilt portion 24. As best seen in FIG. 6, members 40 and 42 comprise a plurality of corresponding pins 48 for making an electrical connection between the wiring harness 34 and the switch module 30.

It should also be noted that the terms "first", "second", and "third" may be used herein to modify elements performing similar and/or analogous functions. These modifiers do not imply a spatial, sequential, or hierarchical order to the modified elements, unless otherwise indicated.

While the invention has been described with reference to one or more an exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A steering column assembly, comprising:
   a support structure configured for securement to one or more portions of a vehicle;
   a tilt portion having first and second ends, said first end pivotally secured to said support structure at a pivot axis such that said tilt portion can pivot about said pivot axis through a selected range of motion with respect to said support structure, said second end configured to be operably coupled to a steering wheel;
   a first electrical connecting member disposed on said tilt portion proximate said first end of said tilt portion a distance in a range of 18 to 33 millimeters from said pivot axis, said first electrical connecting member being connectable to a wiring harness such that said first electrical connecting member and said wiring harness are in electrical communication with one another; and
   a switch module disposed on said tilt portion, said switch module having a second electrical connecting member, said first and second electrical connecting members being configured to mate such that said switch module and said wiring harness are in electrical communication with one another.

2. The steering column assembly as in claim 1, wherein said wiring harness is configured to provide switch signals from said switch module to a device electrically coupled to said wiring harness.

3. The steering column assembly as in claim 2, wherein said switch signals are selected from the group consisting of low current signals, control voltage signals, and combinations of the foregoing.

4. The steering column assembly as in claim 1, wherein said first electrical connecting member is integral with said tilt portion.

5. The steering column assembly as in claim 1, wherein said tilt portion comprises a casting provision proximate said pivot axis, said casting provision being configured to receive said first electrical connecting member therein.

6. The steering column assembly as in claim 5, wherein said switch module is secured to said casting provision by a threaded fastener.

7. The steering column assembly as in claim 1, wherein said first and second electrical connecting members are configured to slideably mate with one another.

8. The steering column assembly as in claim 1, wherein said switch module controls one or more of turn signals, windshield wipers, head lights, driving lights, windshield washer fluid pumps, intermittent wiper delays, ignition systems, supplement restraint system components, electronic security devices, cruise control, audio system control, hands-free telephone systems, navigation systems, and combinations of one or more of the foregoing.

9. A steering column assembly, comprising:
   a support structure securable to a portion of a vehicle;
   a tilt portion having first and second ends, said first end pivotably secured to said support structure at a pivot axis such that said tilt portion is pivotable with respect to said support structure about said pivot axis through a selected range of motion, said second end configured to be operably coupled to a steering wheel;
   a first electrical connecting member disposed on said tilt portion proximate said first end of said tilt portion a distance in a range of 18 to 33 millimeters from said pivot axis;
   a wiring harness in electrical communication with said first electrical connecting member; and
   a switch module disposed on said tilt portion, said switch module having a second electrical connecting member, said second electrical connecting member in electrical communication with said first electrical connecting member proximate said pivot axis to accommodate for said range of motion of said tilt portion without a separate strain relief mechanism.

10. The steering column assembly as in claim 9, wherein said wiring harness is configured to provide switch signals from said switch module to a device electrically coupled to said wiring harness.

11. An integrated electrical connection for a steering column assembly, comprising:
    a wiring harness having a bulkhead connection disposed at one end and a first electrical connecting member at an opposite end; and
    a second electrical connecting member disposed on a switch module, said first and second electrical connecting members being configured to slideably mate such that said switch module and said bulkhead connection are in electrical communication with one another,
    said bulkhead connection being connectable to the steering column assembly at a first end of a first portion of the steering column assembly, a second end of said first portion being pivotally connected to a pivot axis at a third end of a second portion of the steering column assembly such that said second portion having said switch module disposed thereon is configured to pivot about said pivot axis through a selected range of motion with respect to said first portion, said first electrical connecting member being disposed on said second portion proximate said third end of said second portion a distance in a range of 18 to 33 millimeters from said pivot axis, a fourth end of said second portion of steering column assembly is configured to be operably coupled to a steering wheel.

12. The integrated electrical connection as in claim 11, wherein said wiring harness is configured to provide switch signals from said switch module to said bulkhead connection.

13. The integrated electrical connection as in claim 12, wherein said switch signals are selected from the group consisting of low current signals, control voltage signals, and combinations of the foregoing.

14. The integrated electrical connection as in claim 11, wherein said first electrical connecting member is integral with said second portion.

15. The integrated electrical connection as in claim 11, wherein said second portion comprises a casting provision proximate said pivot axis, said casting provision being configured to receive said first electrical connecting member therein.

* * * * *